(12) United States Patent
Brothers et al.

(10) Patent No.: US 6,956,560 B2
(45) Date of Patent: Oct. 18, 2005

(54) SELECTION OF MATHEMATICAL OBJECTS FROM THE HISTORY SCREEN ON A HANDHELD DEVICE

(75) Inventors: Malgorzata A. Brothers, Plano, TX (US); J. Douglas Child, Maitland, FL (US); Laura K. Harvey, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 506 days.

(21) Appl. No.: 09/938,772

(22) Filed: Aug. 24, 2001

(65) Prior Publication Data

US 2003/0038784 A1 Feb. 27, 2003

(51) Int. Cl.[7] ................................................. G09G 5/00
(52) U.S. Cl. ....................................... 345/169; 708/142
(58) Field of Search ................................ 345/156, 157, 345/168, 169, 684–688, 440–440.2; 708/140–146, 109, 130–131; 382/189

(56) References Cited

U.S. PATENT DOCUMENTS

| | | | | |
|---|---|---|---|---|
| 4,852,057 A | * | 7/1989 | Patton | 708/136 |
| 5,067,102 A | * | 11/1991 | Eisenstein | 708/142 |
| 5,335,193 A | * | 8/1994 | Kawawaki | 708/142 |
| 5,515,304 A | * | 5/1996 | Ishii et al. | 708/142 |
| 5,559,512 A | * | 9/1996 | Jasinski et al. | 341/22 |
| 5,594,673 A | * | 1/1997 | Coffin | 708/145 |

OTHER PUBLICATIONS

"Symbolic Math Guide, A Concept APP for the TI–89 and TI–92 Plus", at website: http://education.ti.com/product/tech/92p/apps/smg.html.

"TI–89 & TI–92 Plus Flash Software Guidebook, Symbolic Math Guide Application—Documentation, Symbolic Math Guide Application—Guided Tour, and Calculus with Symbolic Math Guide Application Instructor's Guide", at website: http://education.ti.com/product/tech/92p/apps/92p17/92p92p17gbus.html.

"TI–89/TI–92 Plus Developer Guide", Beta Version .02, Chapter 15, at website: http://education.ti.com/pdf/product-info/sdk/sdk8992pguide.pdf.

* cited by examiner

*Primary Examiner*—Regina Liang
(74) *Attorney, Agent, or Firm*—J. Dennis Moore; W. James Brady, III; Frederick J. Telecky, Jr.

(57) ABSTRACT

A graphing calculator (10) having a user interface that allows the user to easily select mathematical objects from the history screen and incorporate those objects as inputs. The user interface preferably includes a sub-expression selection mode that allows the user to manipulate a selection box over the desired mathematical object.

12 Claims, 4 Drawing Sheets

FIG. 3d

| F1▼ | F2▼ | F3 | F4 | F5 | F6▼ | F7▼ |
|---|---|---|---|---|---|---|
| Prob Set | Prob | a+b | Trans | | ? | Tools |

P1: Solve for x $2 \cdot x = -3$

▶ divide each side by 2

$$\frac{2 \cdot x}{2} = \frac{-3}{2}$$

▶ simplify

Use ←,→,↓,↑,Shift ←,Shift →,ESC, F3, F4, F7

FIG. 3e

| F1▼ | F2▼ | F3▼ | F4▼ | F5 | F6▼ |
|---|---|---|---|---|---|
| Tools | Algebra | Calc | Other | PrgmID | Clean Up |

118 — 2*x/2=-3/2

MAIN    RAD AUTO    FUNC    0/30

FIG. 4a

| F1▼ | F2▼ | F3 | F4 | F5 | F6▼ | F7▼ |
|---|---|---|---|---|---|---|
| Prob Set | Prob | a+b | Trans | | ? | Tools |

P2: Solve for x

▶ divide each side by 2

$$\frac{2 \cdot x}{2} = \frac{-3}{2}$$

▶ simplify $x = \frac{-3}{2}$

Use ←,→,↓,↑,Shift ←,Shift →,ESC, F3, F4, F7

FIG. 4b

| F1▼ Prob Set | F2▼ Prob | F3 [a+b] | F4 Trans | F5 | F6▼ ? | F7▼ Tools |

P1: Solve for x $2 \cdot x = -3$
► divide each side by 2
$\dfrac{\boxed{2 \cdot x}}{2} = \dfrac{-3}{2}$
► simplify Use ←, →, ↓, ↑, Shift ←, Shift →, ESC, F3, F4, F7

FIG. 4c

| F1▼ Prob Set | F2▼ Prob | F3 [a+b] | F4 Trans | F5 | F6▼ ? | F7▼ Tools |

P3: Solve for x $x^2 - 3 \cdot x = 4$
► add ⁻4 to each side
$x^2 - 3 \cdot x + {}^-4 = 4 + {}^-4$
► simplify
$\boxed{x^2} - 3 \cdot x - 4 = 0$ Use ←, →, ↓, ↑, Shift ←, Shift →, ESC, F3, F4, F7

FIG. 4d

| F1▼ Prob Set | F2▼ Prob | F3 [a+b] | F4 Trans | F5 | F6▼ ? | F7▼ Tools |

P3: Solve for x $x^2 - 3 \cdot x = 4$
► add ⁻4 to each side
$x^2 - 3 \cdot x + {}^-4 = 4 + {}^-4$
► simplify
$\boxed{x^2 - 3 \cdot x} - 4 = 0$ Use ←, →, ↓, ↑, Shift ←, Shift →, ESC, F3, F4, F7

US 6,956,560 B2

SELECTION OF MATHEMATICAL OBJECTS FROM THE HISTORY SCREEN ON A HANDHELD DEVICE

TECHNICAL FIELD OF THE INVENTION

This invention relates to electronic calculators, and more particularly to a calculator that allows the user to select mathematical objects which are valid parts of other mathematical objects from the history screen and copy them to another input.

BACKGROUND OF THE INVENTION

Electronic calculators have become a common tool for teaching students mathematics. In particular, the advantages of graphing calculators are being utilized in the classroom. Graphing calculators are characterized by a larger screen, which permits the entry of mathematical objects in a logical format. They also permit graph displays and table displays. They have sophisticated programming capability. They often permit data transmission to other computing devices, directly or via a data storage medium, as well as data collection via various interface protocols. Particular calculator models are often designed for particular educational levels. For example, a calculator for middle school students might have less advanced features than one designed for older students. However, regardless of the level for which a calculator is designed, a continual goal in designing them is to provide a logical and easy to use interface.

Some prior graphing calculators would allow the user to view a history screen, which is a scrolling display of previous display outputs. However, the user interface for these functions in the prior art was not able to select and incorporate mathematical objects from the history screen.

SUMMARY OF THE INVENTION

An embodiment of the present invention is a graphing calculator, which allows the user to easily select mathematical objects from the history screen and incorporate them as inputs. The user interface of the present invention calculator helps the student to more readily use previously entered or developed mathematical objects in subsequent work. Similarly, other embodiments include the same user interface functionality in a software application package that is executed on a graphing calculator.

The calculator in the present invention may otherwise be a conventional graphing calculator. Namely, the calculator screen is capable of two-dimensional displays and of displaying at least straight lines in any direction and a cursor. A key panel has keys at least capable of selecting positions of the cursor and moving the cursor horizontally or vertically on said screen. A processor is operable to execute selection of mathematical objects that instructs the processor to perform the following steps:

In an embodiment of the invention the calculator includes a sub-expression or mathematical object selection mode that allows the user to place a selection box over the desired portion of the mathematical object to be copied. These copied objects can then be placed in other applications of the calculator or in the calculator input line. The present invention's selection of mathematical objects provides students an intuitive method to facilitate learning the structure of mathematical objects.

BRIEF DESCRIPTION OF THE DRAWINGS

FIGS. 3a–e illustrate screen displays for the basic steps of sub-expression selection.

FIGS. 4a–c illustrate other selection box manipulations to select a desired mathematical object according to another embodiment of the present invention.

DETAILED DESCRIPTION OF THE INVENTION

Figure 1:
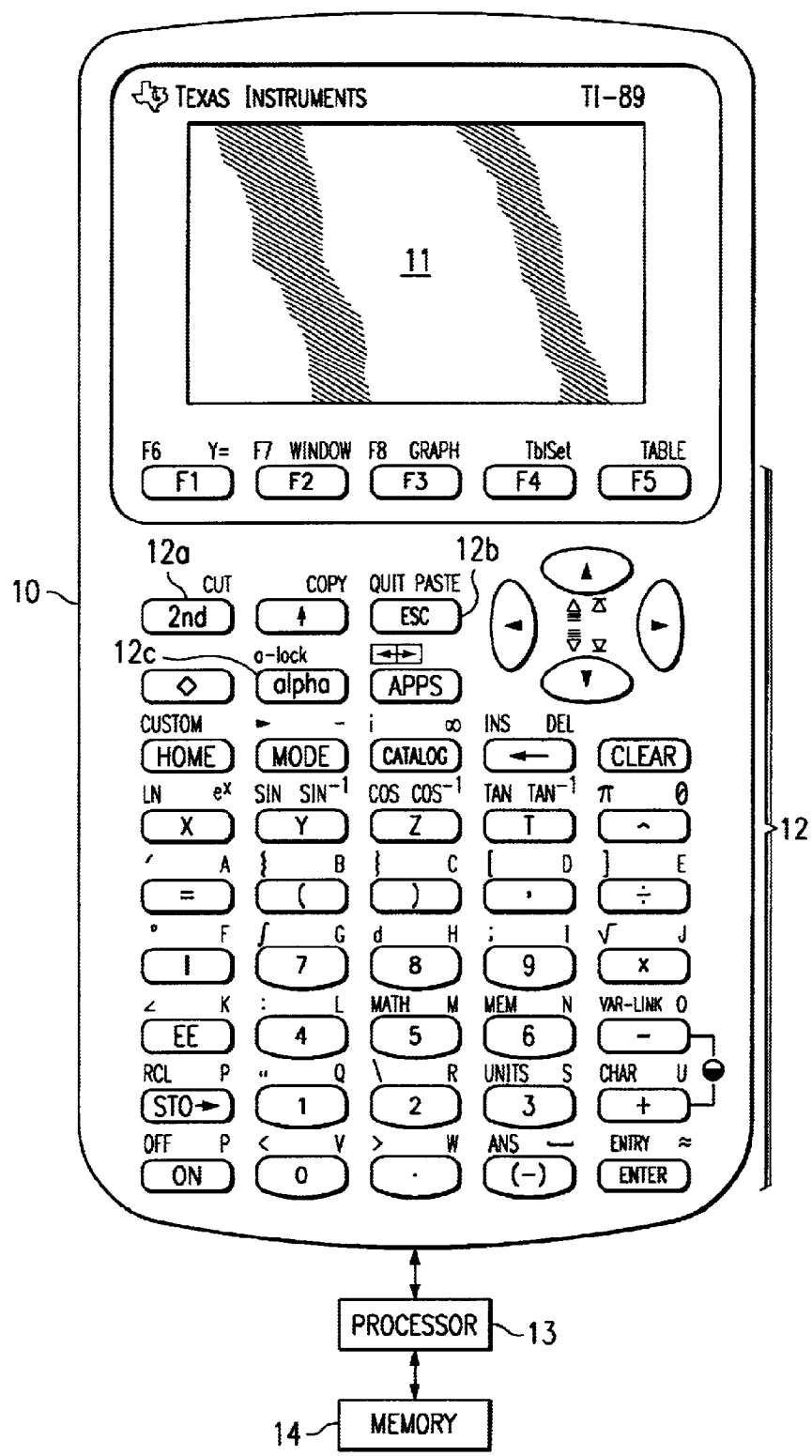
FIG. 1 illustrates the front panel of a calculator 10 that allows the user to select mathematical objects from the history screen and copy them to another input.

FIG. 1 illustrates the front panel of a calculator 10, which incorporates the features of the present invention. Calculator 10 is described herein in terms of particular software and hardware features of the TI-89, a commercially available graphing calculator manufactured by Texas Instruments Incorporated. Apart from the features of the present invention, many of the features of calculator 10 described herein are typical of graphing calculators, while other features are unique to the TI-89 and TI92 Plus "family" of TI calculators. The use of the TI-89 is for purposes of description, and does not limit the invention. The features that are the subject of the present invention could be incorporated into other calculators that provides graphical displays, or they could be incorporated into other computer based teaching tools and handheld computers.

In FIG. 1, the screen 11 of calculator 10 has a "graphical display", as that term is used herein. In addition to the ability to draw graphical displays of various types, some of the software features of calculator 10 include, software applications loading and storage, keystroke programming. It also permits data collection, display and analysis.

Various hardware features include a large pixel screen 11, which is 100×160 pixels. A keypad 12 has various keys for data and command entry, some of which are used to implement the invention and are described herein. The calculator includes a processor 13 connected to a memory unit 14 a 256K byte RAM and 721K byte application space. Other features are an I/O port for data linking, and a unit-to-unit link cable connection capability.

As is typical of calculators, calculator 10 has a secondary function key, 2nd key 12a, which permits other keys to have two functions. For example, by pressing 2nd key 12a and then ESC/QUIT key 12b, the calculator performs the QUIT function. For simplicity of explanation herein, a key having two functions is referred to in terms of the function appropriate for the context, i.e., when discussing the QUIT function, the ESC/QUIT key 12b is referred to as the QUIT key 12b. Similarly, calculator 10 has an Alpha key 12c, which when depressed makes the other keys subsequently depressed to input an alpha character.

Figure 2:
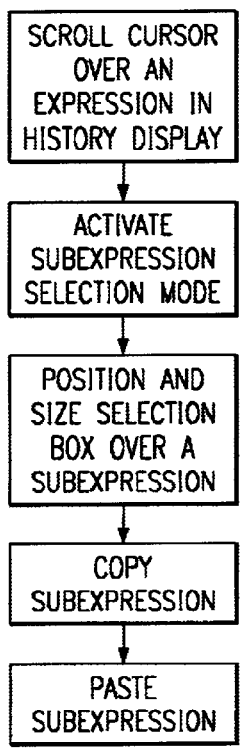
FIG. 2 illustrates the basic steps of using the calculator to select mathematical objects from the history screen in accordance with the invention.

FIG. 2 illustrates the basic steps of using calculator 10 to select a valid mathematical object in the history screen in accordance with the invention. FIG. 2 is drawn from the point of view of steps performed by the user. However, the same steps could be described in terms of activities performed by the computer. For example, steps involving entry of data by the user could also be described as receipt of data by the calculator.

The basic steps described in FIG. 2 are as follows: scroll the cursor over an expression or equation in the history display, activate the sub-expression selection mode, position and/or size the selection box over a selected valid object, copy the selected object, and paste the object. These steps are further described herein below.

FIG. 3 illustrates an example of the screen displays for the basic steps of the sub-expression selection. The screen displays are typical for the calculator illustrated in FIG. 1 while running an application called Symbolic Math Guide (SMG). The Symbolic Math Guide provides step-by-step problem-solving transformations for classes of symbolic computations such as algebra and calculus to help students learn symbolic computation. The sub-expression selection according to the present invention allows the user to select and copy any portion of an expression or equation directly from the history screen or application to another input area of the calculator such as the input line or to another application.

Figure 3A:
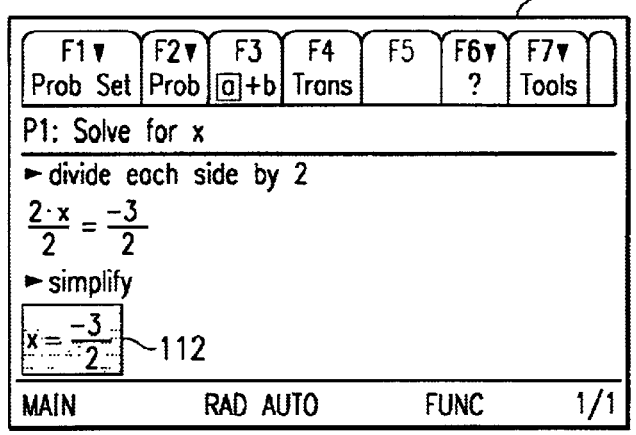
Figure 3B:
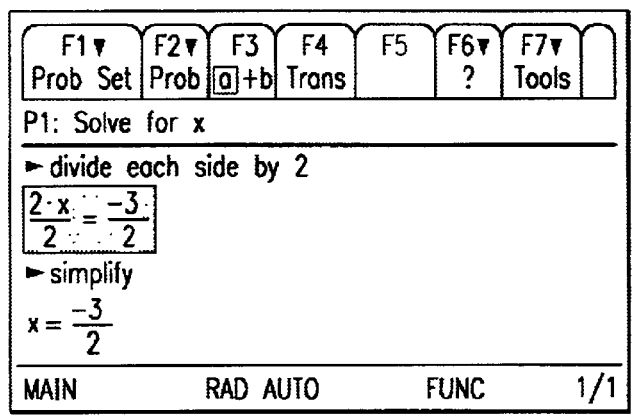

FIG. 3a shows the display screen 110 after solving a problem using the SMG. A dark inverse-video area 112 is the cursor to indicate the current control location of the SMG display. While in the SMG, or at other times when using the calculator, pressing the up-arrow will move the cursor into the history display. The history display scrolls the screen up to past or recently displayed text and data. FIG. 3b shows the cursor moved up one line from FIG. 3a. The cursor now is shown over the previously displayed equation. Pressing the function key F3 will activate the sub-expression selection mode and change the display from that shown in FIG. 3b to that shown in FIG. 3c. In the embodiment shown here, the cursor in the sub-expression selection mode is changed to a dashed rectangle or box 114 around the sub-expression.

In the sub-expression selection mode, the user can manipulate the mathematical object to be selected by changing the box to surround the desired object using the keyboard keys 12. The sub-expression selection software insures the manipulation of the box selects only valid mathematical objects. Keys that are active to manipulate the box are shown on the prompt line 116. Pressing the up-arrow key expands the box to include a "larger" portion of the expression or equation in the selection cursor. Pressing the up-arrow while on the expression shown in FIG. 3c expands the selection box to that shown in FIG. 3d.

After the desired object has been selected, it can then be copied and pasted into other places in the calculator such as the input line of the calculator. In the illustrated embodiment, the copy and paste keys are marked alternate keys on the calculator keyboard. After the mathematical object has been copied, the calculator must be placed back into the normal input mode or moved to another application where the mathematical object is to be placed. The keystrokes to return to the normal input mode may include the "quit" key etc. When the cursor is in the desired input location, the selected mathematical object is copied to the cursor location using the "copy" key. The result for the illustrated sequence is shown in FIG. 3e which shows the selected object copied to the input line 118.

FIG. 4 illustrates other selection box manipulations to select a desired mathematical object according to another embodiment of the present invention. In this embodiment the up-arrow and down-arrow directional keys are used to select "larger" or "smaller" sub-expressions, the left-arrow and right arrow are used to tab to the next sub-expression, the shift-left-arrow and shift-right-arrow to select the subsequent sub-expressions, and the "ESC" or F3 key to exit the selection mode.

Figure 3C:
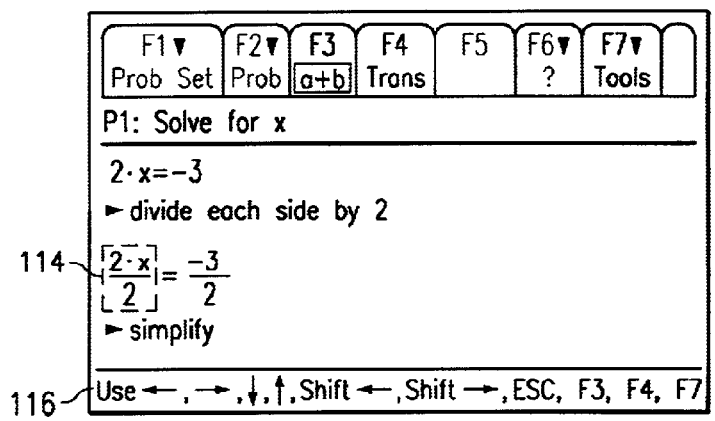

FIG. 4a illustrates the movement of the selection box using the right-arrow key from the display shown in FIG. 3c. The selection box is moved to the sub-expression to the right of the equal sign. Pressing the left-arrow key will move the dashed selection box back to that shown in FIG. 3c. Similarly, FIG. 4b illustrates the movement of the selection box using the down-arrow key from the display shown in FIG. 3c. The selection box is moved to a "smaller" sub-expression of the previous mathematical object. FIGS. 4c and 4d illustrate an example of using the shift-right-arrow key. FIG. 4d illustrates the movement of the selection box using the shift-right-arrow key from the display shown in FIG. 4c. The selection box is moved to include the sub-expression to the right. The shift-left arrow key operates in a similar manner.

Other Embodiments

Although the present invention has been described in detail, it should be understood that various changes, substitutions, and alterations could be made hereto without departing from the spirit and scope of the invention as defined by the appended claims.

What is claimed is:

1. A handheld device having a user interface capable of selection of a mathematical object in an expression or equation, comprising:
    a screen capable of displaying at mathematical objects and a cursor;
    a key panel having keys at least capable of selecting positions of said cursor and moving said cursor horizontally or vertically on said screen;
    a processor for executing programming that provides a user interface to allow a user to perform the following steps:
        a) scroll the cursor to a valid mathematical expression or equation in a history display,
        b) activate a sub-expression mode having a selection box capable of indicating a selected valid object,
        c) control the extent of the portion of the expression or equation that is selected by the selection box, and
        d) copy the selected portion of the expression or equation.

2. The handheld device of claim 1, wherein said processor is further programmed to allow the user to control the extent of the portion of the expression or equation that is selected by the selection box using only directional keys and modifier keys.

3. The handheld device of claim 1, wherein said processor is further programmed to paste the copied selected portion of the expression or equation.

4. The handheld device of claim 3 wherein said processor is further programmed to allow the user to use the copied selected portion of the expression or equation in other mathematical applications.

5. A graphing calculator having a user interface capable of selection of a mathematical object in an expression or equation, comprising:
    a screen capable of displaying at mathematical objects and a cursor;
    a key panel having keys at least capable of selecting positions of said cursor and moving said cursor horizontally or vertically on said screen;
    a processor for executing programming that provides a user interface to allow a user to perform the following steps:
        a) scroll the cursor to a valid mathematical expression or equation in a history display,
        b) activate a sub-expression mode having a selection box capable of indicating a selected valid object,
        c) control the extent of the portion of the expression or equation that is selected by the selection box, and
        d) copy the selected portion of the expression or equation, and
        e) paste the copied selected portion of the expression or equation.

6. The graphing calculator of claim 5 wherein said processor is further programmed to allow the user to control the extent of the portion of the expression or equation that is selected by the selection box using only directional keys and modifier keys.

7. The graphing calculator of claim 5 wherein said processor is further programmed to allow the user to use the copied selected portion of the expression or equation in other mathematical applications.

8. The graphing calculator of claim 6, wherein said processor is further programmed to allow the user to use the copied selected portion of the expression or equation in other mathematical applications.

9. A software user interface for a graphing calculator having an input display with mathematical objects which allows a user to perform the following steps:

a) scroll a cursor to an expression or equation in a history display, b) activating a sub-expression mode having a selection box capable of indicating a selected valid object, c) controlling the extent of the portion of the expression or equation that is selected by the selection box, and d) copying the selected portion of the expression or equation.

10. The user interface of claim 9, wherein said processor is further programmed to allow the user to use the copied selected portion of the expression or equation in other mathematical applications.

11. The user interface of claim 9, wherein said processor is further programmed to allow the user to use directional keys to size and position the selection box over any object of the expression or equation.

12. The user interface of claim 1, wherein said processor is further programmed to allow the user to use directional keys to size and position the selection box to select a sub-expression.

* * * * *